United States Patent [19]

Murphy

[11] Patent Number: 5,152,269
[45] Date of Patent: Oct. 6, 1992

[54] COMBINED FUEL PRESSURE REGULATOR AND FUEL INJECTOR DEVICE

[75] Inventor: Kevin A. Murphy, Sterling Heights, Mich.

[73] Assignee: Siemens Automotive L.P., Auburn Hills, Mich.

[21] Appl. No.: 828,639

[22] Filed: Jan. 31, 1992

[51] Int. Cl.⁵ .................... F02M 55/00; F16K 31/126
[52] U.S. Cl. .................................. 123/470; 123/456; 123/463; 137/510
[58] Field of Search ................ 137/510; 123/447, 456, 123/463, 468, 467, 469, 470

[56] References Cited

U.S. PATENT DOCUMENTS

| | | | |
|---|---|---|---|
| 4,570,602 | 2/1986 | Atkins et al. | 123/468 |
| 4,903,667 | 2/1990 | Sonnenmoser et al. | 123/463 |
| 4,928,729 | 5/1990 | Hornby | 137/510 |

*Primary Examiner*—Stephen M. Hepperle
*Attorney, Agent, or Firm*—George L. Boller; Russel C. Wells

[57] ABSTRACT

A fuel pressure regulator has one or more fuel-injector-receiving sockets directly attached to the cylindrical sidewall of its housing such that pressurized fuel in the fuel chamber portion of the housing flows directly into the socket(s).

8 Claims, 3 Drawing Sheets

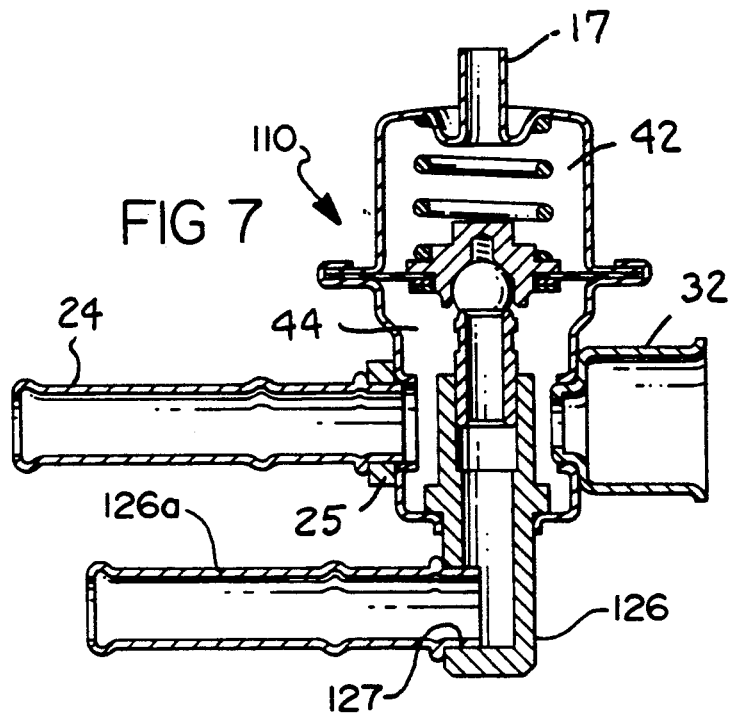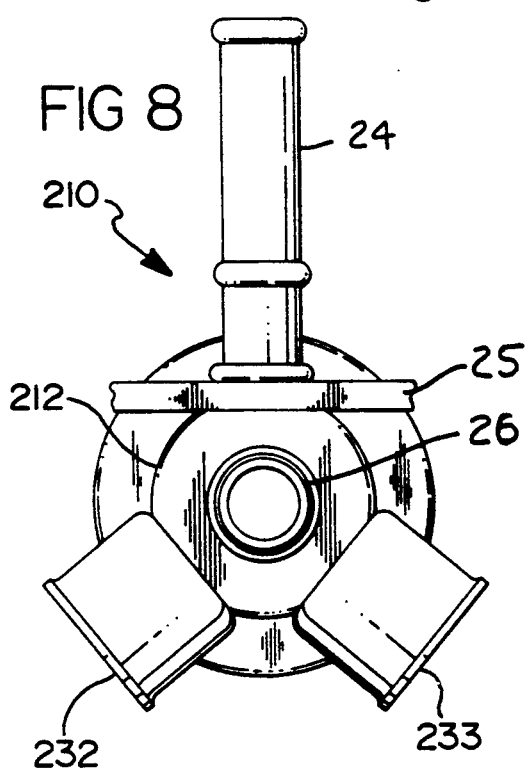

COMBINED FUEL PRESSURE REGULATOR AND FUEL INJECTOR DEVICE

FIELD OF THE INVENTION

This invention relates to fuel injection systems for spark-ignited internal combustion engines.

BACKGROUND AND SUMMARY OF THE INVENTION

One type of fuel pressure regulator valve for a fuel injection system comprises a hollow housing that is divided by a diaphragm assembly into two chambers, one of which is a control chamber and the other of which is a fuel chamber. The fuel chamber has an inlet via which pressurized fuel enters and an outlet via which excess fuel returns to tank. The diaphragm assembly carries a valve element that coacts with a valve seat disposed in communication with the fuel return outlet. The control chamber houses a helical spring which biases the diaphragm assembly, with the attached valve element, toward the valve seat to thereby establish the regulation pressure. The control chamber has a vacuum port via which it communicates with a variable vacuum source, typically engine intake manifold vacuum, so as to keep the pressure drop across the fuel injectors fairly insensitive to changes in intake manifold vacuum.

One example of a fuel pressure regulator of this known type is described in U.S. Pat. No. 4,928,729, which is owned by the assignee of the present invention. The disclosure of U.S. Pat. No. 4,928,729 is incorporated herein by reference. Another known fuel pressure regulating device is described in U.S. Pat. No. 4,729,360.

U.S. Pat. Nos. 4,649,884 and 4,653,528 relate to fuel pressure pulsation absorbers and dampers. In U.S. Pat. No. 4,649,884, a fuel rail has a flexible metal membrane disposed therein to absorb pulsations. While that fuel rail design does act to minimize fuel pulsations to a certain extent, it still requires a fuel pressure regulator which is separate and independent from the membrane. The patent does disclose a plurality of cylindrical sockets which sealedly receive fuel injectors therein.

Fuel injection systems which utilize only a single fuel injector are known and have been used in connection with throttle body injection (TBI) systems. While a TBI system also utilizes a fuel pressure regulator to control pressure of fuel supplied to the injector, the fuel pressure regulator is typically remote from the fuel injector.

Many types of electromechanical operated fuel injectors are known and are commercially available. One illustrative type is a top-feed, solenoid-actuated fuel injector described in commonly assigned U.S. Pat. No. 4,971,254.

In engines that are small and/or have only a small number of cylinders, space is at a premium. The present invention arises in connection with adapting a fuel injection system to small, one and two cylinder engines.

The present invention relates to a combination fuel pressure regulator and fuel injector and generally comprises:

a housing having a hollow interior divided into a fuel chamber and a control chamber by a pressure regulating diaphragm that carries a valve element;
an inlet via which pressurized fuel is delivered to the fuel chamber;
a valve seat disposed within the fuel chamber for coaction with the diaphragm-carried valve element and leading to an outlet via which excess fuel is returned from the fuel chamber to tank;
a spring that biases the diaphragm and valve element toward the valve seat for establishing the regulation pressure;
an injector-receiving socket mounted directly on the cylindrical sidewall of the housing so that the fuel chamber is communicated to the socket in a fluid-tight manner; and
a fuel injector having an inlet received in the socket in a fluid-tight manner and receiving pressurized fuel from the fuel chamber.

For a more complete understanding of the present invention, the reader is referred to the following detailed description, which should be read in conjunction with the accompanying drawings illustrating a preferred embodiment according to the best mode presently contemplated for carrying out the invention. Throughout the following description and in the drawings, like numbers refer to like parts throughout the several views, in which:

BRIEF DESCRIPTION OF THE DRAWINGS

FIG. 7 is a cross-sectional view of a second embodiment in accordance with the present invention; and FIG. 8 is a bottom plan view of a third embodiment in accordance with the present invention.

DESCRIPTION OF THE PREFERRED EMBODIMENT

Figure 1:
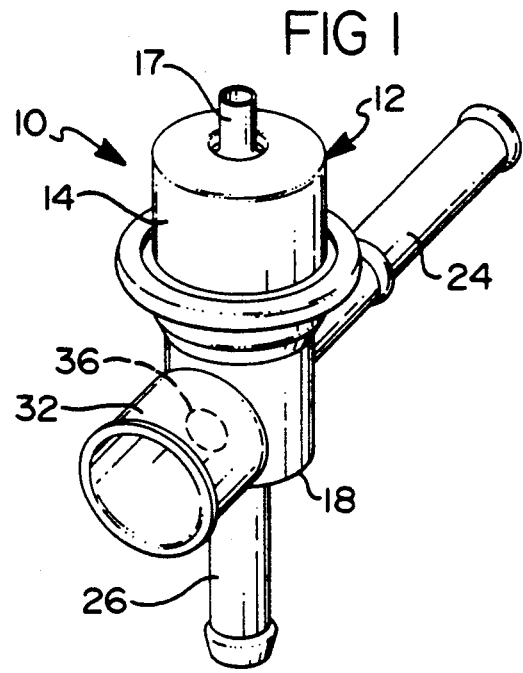
FIG. 1 is a perspective view of a fuel pressure regulator in accordance with a first embodiment of the present invention.

FIGS. 1-6 illustrate a first embodiment of fuel pressure regulator 10 embodying principles of the invention and including a housing 12 having a hollow interior. Housing 12 is generally cylindrical in shape, and is formed from material which is relatively rigid, strong, durable, and tolerant to continued exposure to various types of known fuels, such as hydrocarbons and alcohols for example. Suitable materials for housing 12 include sheet metal and fuel tolerant plastics. (It will be understood that, as used hereinafter, the terms "upper", "lower", and the like refer to the orientation of the assembly 10 as shown in the drawings. One skilled in the art will realize that device 10 may be mounted in orientations other than that illustrated and still perform effectively.)

In the depicted embodiment, housing 12 includes an inverted-cup-shaped cylindrical upper section 14 which is open at the bottom thereof. A transverse radial flange 16 extends around the lowermost extension of section 14. A vacuum port 17 is formed in the section's upper end wall and is adapted to be connected to a source of vacuum, such as intake manifold vacuum (not shown).

Housing 12 also includes a generally cylindrical cup-shaped lower section 18 which is open at the top, and which has a radially extending transverse flange 20 around the uppermost extension thereof. Flange 20 is folded over and crimped onto flange 16 of upper section 14 in a fluid-tight manner.

Figure 2:
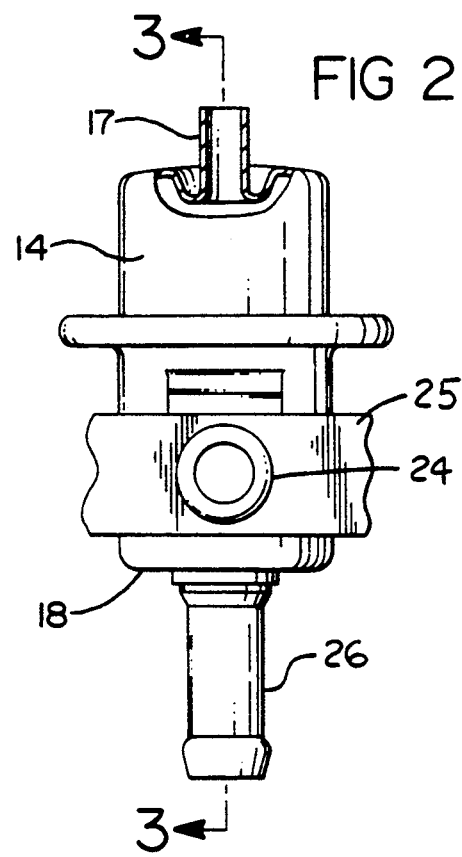
FIG. 2 is a side elevational view, partially cut away, of the embodiment of FIG. 1.
Figure 3:
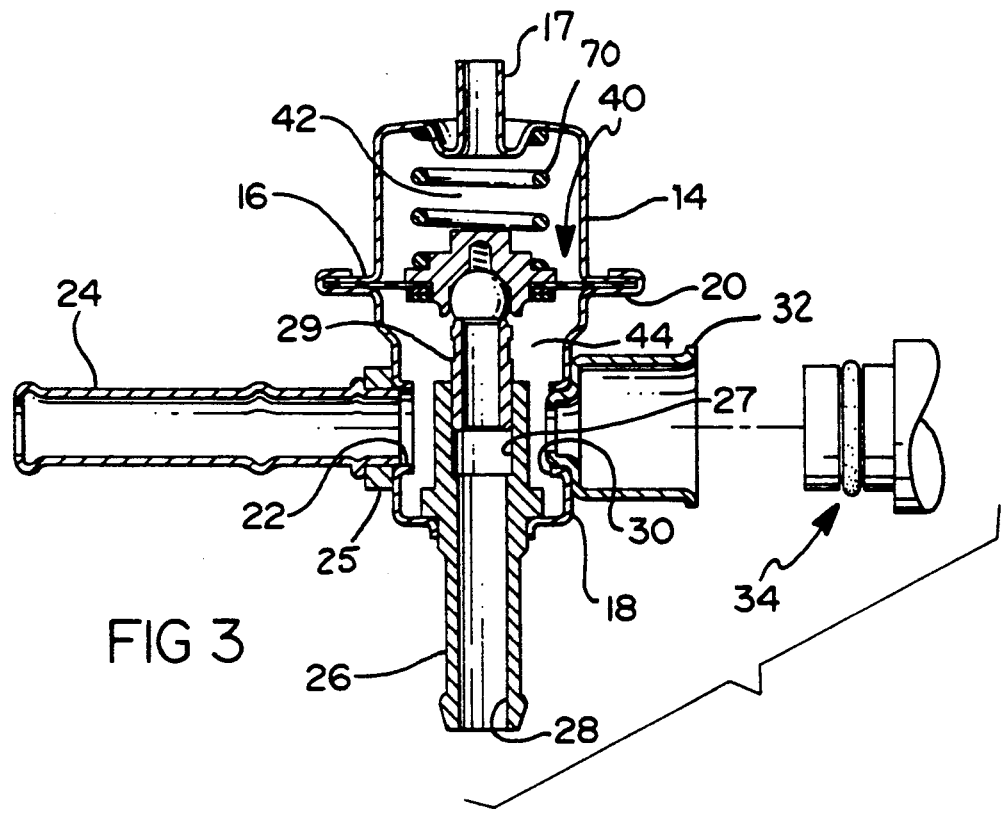
FIG. 3 is a cross-sectional view, taken along line 3—3 of FIG. 2, and includes a fragmentary portion of a fuel injector exploded away for illustrative purposes.
Figure 4:
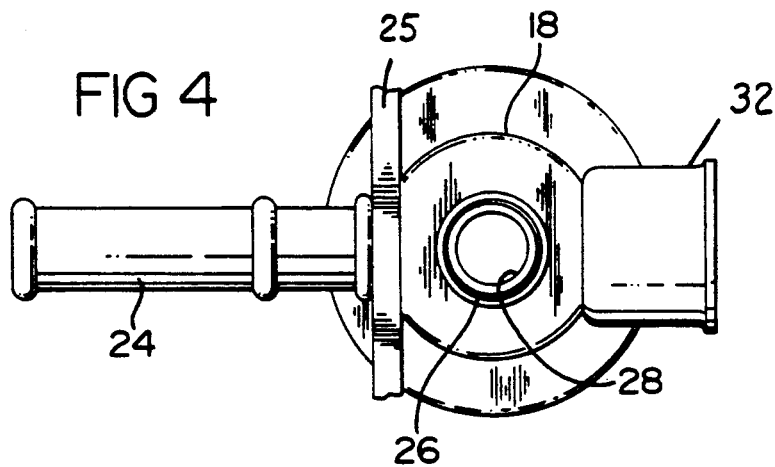
FIG. 4 is a bottom plan view of the embodiment of FIGS. 1-3.

Lower section 18 has an inlet 22 via which pressurized fuel is supplied to the device. It will be understood that, in a vehicular environment, a mechanical or electric fuel pump (not shown) will be disposed upstream of the fuel pressure regulator 10 and in fluid communication with inlet 22. A fuel supply pipe 24 is preferably affixed to inlet 22 to provide a nipple onto which can be telescoped a fuel supply hose (not shown) through which the pressurized fuel is supplied. FIGS. 2, 3 and 4 show a position of a representative mounting bracket 25 for rigidly mounting the assembly on an engine. Housing 12 also includes a cylindrical outlet pipe 26 coaxial with section 18 and passing through a hole in that section's lower end wall in a fluid-tight manner. The exterior portion of pipe 26 is an outlet 28 in the form of a nipple for a conduit through which excess fuel returns to tank (not shown). Outlet pipe 26 has a coaxial cylindrical bore 27, and its upper internal end receives a hollow cylindrical valve seat 29 that has a flat annular uppermost surface.

Another outlet 30 is provided in lower section 18, specifically in the cylindrical sidewall of housing 12, and a socket 32 is permanently affixed to outlet 30 in a sealed manner. Socket 32 receives the inlet end of a fuel injector 34 in a fluid-tight manner. Thus, the fuel injector's axis lies on a radial to the axis of fuel pressure regulator 10. Socket 32 is somewhat bell-shaped and has a proximal end fitted and joined to a hole in the housing sidewall in a secure and sealed manner. An opening in the socket's proximal end provides for pressure regulated fuel to flow from the fuel pressure regulator to the fuel injector.

The present invention is advantageous as contrasted with previously known designs because it contributes to manufacturing efficiency and it is suitable for packaging with smaller engine configurations.

A diaphragm assembly 40 is disposed between upper and lower sections 14, 18 of housing 12 and divides the hollow interior of the housing into an upper or control chamber 42 thereabove, and a lower or fuel chamber 44 therebelow. Vacuum port 17 is associated with chamber 42 while points of fuel ingress and egress are associated with chamber 44. Diaphragm assembly 40 includes an annular diaphragm 46 whose outer margin is sealingly held between radial flange 16 of upper section 14 and radial flange 20 of lower section 18. It also has a central circular through-aperture 48, and is formed from a flexible resilient material which is fuel tolerant over extended periods of time. Suitable materials for the diaphragm include fiber-reinforced silicone rubber and other fuel tolerant elastomers. Assembly 40 further includes a mount 50 having a central cylindrical body 52 with a medial annular flange 54 extending radially outwardly therearound. Body 52 passes through aperture 48, and the inner margin of diaphragm 46 is sealedly held between flange 54 and a pair of washers 56 which are secured to body 52, as shown.

Figure 5:
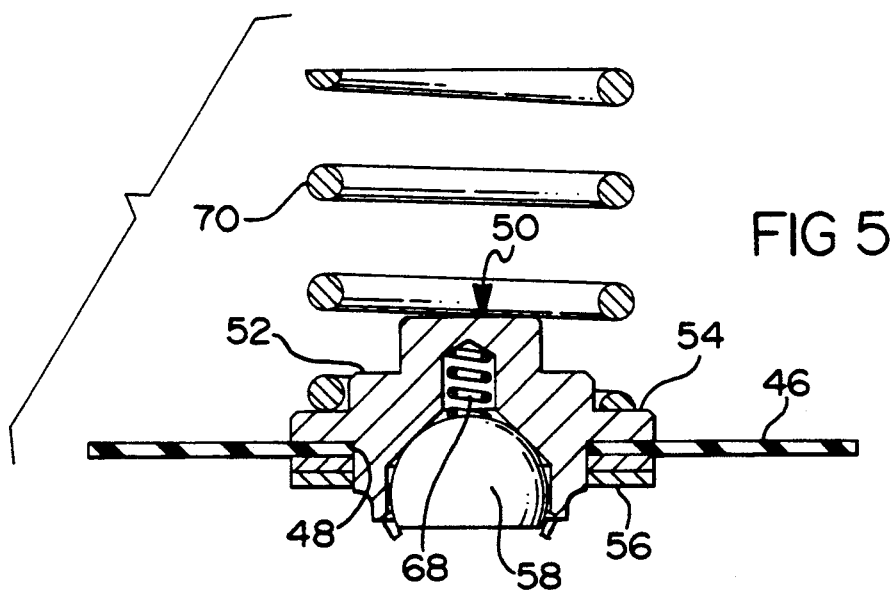
FIG. 5 is an enlarged fragmentary view of a portion of FIG. 3.
Figure 6:
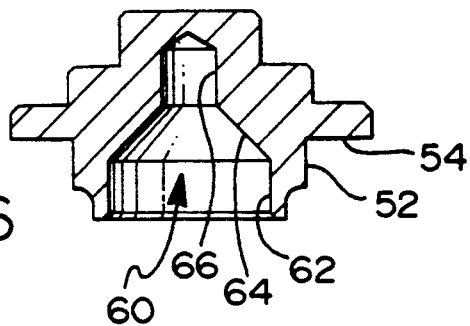
FIG. 6 is a cross-sectional detail view of one of the parts of FIG. 5 by itself.

As shown in FIG. 6, mount 50 has a cavity 60 receiving a valve member 58. Member 58 is a truncated sphere which is larger than a hemisphere and which has a flat truncated surface. Cavity 60 includes a straight cylindrical section 62 having a circular cross-section, a frusto-conically tapered section 64 extending upwardly from straight section 62, and a smaller straight cylindrical section 66 also having a circular cross-section and which extends upwardly from tapered section 64 and ends in a conically tapered tip. Section 66 is provided to receive a small coil spring 68 therein which acts to bias the valve member 58 downwardly in mount 50. As shown in FIG. 5, the lower edge of body 52 is crimped inwardly to retain valve member 58 within cavity 60 while still allowing swiveling of member 58 within the mount for proper alignment and coaction with seat 29. Alternatively, the recess and retaining washer design which is described in U.S. Pat. No. 4,928,729 may be used to retain valve member 58 within cavity 60.

A large helical coil spring 70 is disposed in control chamber 42 between flange 54 and the upper end wall of section 14. Spring 70 biases mount 50 downwardly within housing 12 to urge the flat truncated surface of valve member 58 toward coaction with the flat uppermost surface of valve seat 29. The pressure of fuel in the fuel chamber urges diaphragm assembly 40 upwardly in housing 12 counter to the force of spring 70 and the pressure in control chamber 42. The combined effect is to pressure regulate the fuel in chamber 44 to a desired pressure that is fairly insensitive to variations in manifold pressure.

FIG. 7 illustrates a second embodiment of fuel pressure regulator 110 which is substantially identical to embodiment 10, except that, the fuel exit from outlet pipe 126 is a hole 127 in its sidewall into which a supplemental outlet pipe 126a is sealedly fitted. This is done for convenience of assembly and mounting in a specific engine application of fuel pressure regulator 110.

FIG. 8 is a bottom view of a third embodiment of fuel pressure regulator 210 according to the present invention. Two separate sockets 232, 233 are provided in circumferentially spaced relation about the axis of the fuel pressure regulator to receive two separate fuel injectors. Each socket is assembled to the housing sidewall in the same fashion as in the first embodiment.

Although the present invention has been described herein with reference to specific and preferred embodiments thereof, it will be understood that the foregoing description is intended to be illustrative, and not restrictive. Many modifications of the present invention will occur to those skilled in the art. All such modifications which fall within the scope of the appended claims are intended to be within the scope and spirit of the present invention.

Having, thus, described the invention,
What is claimed is:

1. A combination fuel pressure regulator and fuel injector which comprises:
 a housing comprising a cylindrical sidewall and having a hollow interior divided into a fuel chamber and a control chamber by a pressure regulating diaphragm that carries a valve element;
 an inlet via which pressurized fuel is delivered to the fuel chamber;
 a valve seat disposed within the fuel chamber for coaction with the diaphragm-carried valve element and leading to an outlet via which excess fuel is returned from the fuel chamber to tank;
 a spring that biases the diaphragm and valve element toward the valve seat for establishing the regulation pressure;

an injector-receiving socket disposed directly on the cylindrical sidewall of the housing in direct fluid communication with the fuel chamber; and an electromechanical fuel injector having an inlet received in the socket in a fluid-tight manner and receiving pressurized fuel from the fuel chamber; and in which said socket is a separate element that is joined with said cylindrical sidewall in a fluid-tight manner.

2. A combination fuel pressure regulator and fuel injector as set forth in claim 1 in which said socket is disposed such that the axis of the fuel injector lies on a radial to the axis of the housing.

3. A combination fuel pressure regulator and fuel injector which comprises:
 a housing comprising a cylindrical sidewall and having a hollow interior divided into a fuel chamber and a control chamber by a pressure regulating diaphragm that carries a valve element;
 an inlet via which pressurized fuel is delivered to the fuel chamber;
 a valve seat disposed within the fuel chamber for coaction with the diaphragm-carried valve element and leading to an outlet via which excess fuel is returned from the fuel chamber to tank;
 a spring that biases the diaphragm and valve element toward the valve seat for establishing the regulation pressure;
 an injector-receiving socket disposed directly on the cylindrical sidewall of the housing in direct fluid communication with the fuel chamber; and
 an electromechanical fuel injector having an inlet received in the socket in a fluidtight manner and receiving pressurized fuel from the fuel chamber; and
 including a second injector-receiving socket disposed directly on the cylindrical sidewall of the housing in direct fluid communication with the fuel chamber and spaced circumferentially of the first-mentioned socket; and
 a second electromechanical fuel injector having an inlet received in said second socket in a fluid-tight manner and receiving pressurized fuel from the fuel chamber.

4. A combination fuel pressure regulator and fuel injector as set forth in claim 3 in which said second socket is a separate element that is joined with said cylindrical sidewall in a fluid-tight manner.

5. A fuel pressure regulator that is adapted for directly accepting the fuel inlet of an electromechanical fuel injector and comprises:
 a housing comprising a cylindrical sidewall and having a hollow interior divided into a fuel chamber and a control chamber by a pressure regulating diaphragm that carries a valve element;
 an inlet via which pressurized fuel is delivered to the fuel chamber;
 a valve seat disposed within the fuel chamber for coaction with the diaphragm-carried valve element and leading to an outlet via which excess fuel is returned from the fuel chamber to tank;
 a spring that biases the diaphragm and valve element toward the valve seat for establishing the regulation pressure; and
 a socket disposed directly on the cylindrical sidewall of the housing in direct fluid communication with the fuel chamber and shaped for acceptance of the fuel inlet of an electromechanical actuated fuel injector; and
 in which said socket is a separate element that is joined with said cylindrical sidewall in a fluid-tight manner.

6. A fuel pressure regulator as set forth in claim 6 in which said socket is disposed such that the axis of the fuel injector will lie on a radial to the axis of the housing when the fuel injector inlet is accepted in the socket in fluid-tight manner.

7. A fuel pressure regulator that is adapted for directly accepting the fuel inlet of an electromechanical fuel injector and comprises;
 a housing comprising a cylindrical sidewall and having a hollow interior divided into a fuel chamber and a control chamber by a pressure regulating diaphragm that carries a valve element;
 an inlet via which pressurized fuel is delivered to the fuel chamber;
 a valve seat disposed within the fuel chamber for coaction with the diaphragm-carried valve element and leading to an outlet via which excess fuel is returned from the fuel chamber to tank;
 a spring that biases the diaphragm and valve element toward the valve seat for establishing the regulation pressure; and
 a socket disposed directly on the cylindrical sidewall of the housing in direct fluid communication with the fuel chamber and shaped for acceptance of the fuel inlet of an electromechanical actuated fuel injector; and
 including a second socket disposed directly on the cylindrical sidewall of the housing in direct fluid communication with the fuel chamber and spaced circumferentially of the first-mentioned socket;
 said second socket being in direct fluid communication with the fuel chamber and shaped for acceptance of the fuel inlet of an electromechanical actuated fuel injector.

8. A fuel pressure regulator as set forth in claim 7 in which said second socket is a separate element that is joined with said cylindrical sidewall in a fluid-tight manner.

* * * * *